United States Patent
Kimura et al.

(10) Patent No.: US 12,528,371 B2
(45) Date of Patent: Jan. 20, 2026

(54) CHARGING SYSTEM AND CHARGING DEVICE

(71) Applicant: HONDA MOTOR CO., LTD., Tokyo (JP)

(72) Inventors: Toru Kimura, Offenbach/Am Main (DE); Martin Kopp, Offenbach/Am Main (DE); Christian Koebel, Offenbach/Am Main (DE); Hisashi Nagaoka, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 695 days.

(21) Appl. No.: 17/944,295

(22) Filed: Sep. 14, 2022

(65) Prior Publication Data

US 2023/0100944 A1 Mar. 30, 2023

(30) Foreign Application Priority Data

Sep. 29, 2021 (JP) .................................. 2021-159454

(51) Int. Cl.
*B60L 53/126* (2019.01)
*B60L 53/66* (2019.01)
(Continued)

(52) U.S. Cl.
CPC .............. *B60L 53/126* (2019.02); *B60L 53/66* (2019.02); *H02J 7/00032* (2020.01);
(Continued)

(58) Field of Classification Search
CPC .......... B60L 55/00; B60L 53/50; B60L 53/53; B60L 53/12
(Continued)

(56) References Cited

U.S. PATENT DOCUMENTS 9,770,993 B2 * 9/2017 Zhao ........................ B60L 53/51
10,596,920 B2 * 3/2020 Arregui Torres ..... B60L 53/126
(Continued)

FOREIGN PATENT DOCUMENTS

CN 102648110 A 8/2012
JP 2007-252118 A 9/2007
(Continued)

OTHER PUBLICATIONS

Chinese Office Action Corresponding to CN 202211162118, dated Feb. 27, 2025, 16 pages.
(Continued)

*Primary Examiner* — Richard V Muralidar
(74) *Attorney, Agent, or Firm* — Rankin, Hill & Clark LLP

(57) ABSTRACT

Provided is a charging system including: a second power transmission unit; a moving mechanism that moves the second power transmission unit within a moving area including prescribed ranges within a plurality of parking spaces; and a power transmission control unit that, when a first electric vehicle is parked in a first parking space as one of a plurality of parking spaces, moves the second power transmission unit into the prescribed range of the first parking space by the moving mechanism to cause the first power transmission unit mounted to a first electric vehicle and the second power transmission unit to face each other so as to transmit power to the first power transmission unit from the second power transmission unit wirelessly to execute vehicle charging processing for charging the first electric vehicle.

9 Claims, 3 Drawing Sheets

(51) Int. Cl.
*H02J 7/00* (2006.01)
*H02J 50/10* (2016.01)

(52) U.S. Cl.
CPC .......... *H02J 7/0042* (2013.01); *H02J 7/0071* (2020.01); *H02J 50/10* (2016.02)

(58) Field of Classification Search
USPC ........................................................ 320/108
See application file for complete search history.

(56) References Cited

U.S. PATENT DOCUMENTS

| | | |
|---|---|---|
| 2012/0206098 A1 | 8/2012 | Kim |
| 2013/0076296 A1 | 3/2013 | Ushiroda |
| 2016/0075249 A1* | 3/2016 | Grabar .................... B60L 53/65 |
| | | 320/108 |
| 2017/0008409 A1* | 1/2017 | Roberts ................ B60L 53/665 |
| 2019/0217718 A1* | 7/2019 | Arregui Torres ....... B60L 53/35 |

FOREIGN PATENT DOCUMENTS

| | | |
|---|---|---|
| JP | 2008-245416 A | 10/2008 |
| JP | 2010-070985 | 4/2010 |
| JP | 2011-254593 A | 12/2011 |
| JP | 2013-055803 A | 3/2013 |
| JP | 2013-110877 | 6/2013 |
| JP | 2015-154538 A | 8/2015 |

OTHER PUBLICATIONS

Japanese Office Action dated Jul. 18, 2023, Application No. 2021-159454; English machine translation included, 9 pages.

* cited by examiner

CHARGING SYSTEM AND CHARGING DEVICE

INCORPORATION BY REFERENCE

The present application claims priority under 35 U.S.C. § 119 to Japanese Patent Application No. 2021-159454 filed on Sep. 29, 2021. The content of the application is incorporated herein by reference in its entirety.

BACKGROUND OF THE INVENTION

Field of the Invention

The present invention relates to a charging system and a charging device.

Description of the Related Art

Conventionally, there is proposed a parking device that includes: a traverse path for circulating pallets each having an electric vehicle loaded thereon; a charging pallet provided to each of the pallets for charging the electric vehicle; a power feeding line laid along the traverse path; and a current collector provided to the charging pallet and brought to in contact with the power feeding line to feed the power to the charging pallet (see Japanese Translation of PCT international Application Publication No. 2010-70985).

Furthermore, there is proposed a charging system that includes a vehicle parking board capable of being moved while loading an electric vehicle, a first high-frequency wireless power transmission device placed at the vehicle parking board, and a second high-frequency wireless power transmission device placed in a parking lot building, in which wireless power transmission is performed from the second high-frequency power transmission device to the first high-frequency power transmission device (for example, see Japanese Patent Laid-Open No. 2013-110877).

In the conventional parking device and charging system, a charging unit for charging the electric vehicle is provided for each of a plurality of parking spaces of a parking facility, which results in increasing the cost for installing charging equipment.

The present invention is designed in view of such circumstances, and it is an object thereof to provide a charging system and a charging device capable of installing charging equipment capable of charging a plurality of electric vehicles at a low cost.

SUMMARY OF THE INVENTION

As a first aspect for achieving the foregoing object, there is a charging system used in a parking facility having a plurality of parking spaces each corresponding to a single vehicle for charging an electric vehicle parked in the parking space. The charging system includes: a second power transmission unit that performs wireless power transmission with a first power transmission unit mounted to the electric vehicle; a moving mechanism including a mount unit mounting the second power transmission unit, the moving mechanism moving the second power transmission unit mounted to the mount unit within a moving area including each prescribed range within a plurality of the parking spaces; and a power transmission control unit that, when a first electric vehicle is parked in a first parking space as one of a plurality of the parking spaces, moves the second power transmission unit into the prescribed range of the first parking space by the moving mechanism to cause the first power transmission unit mounted to the first electric vehicle and the second power transmission unit to face each other so as to transmit power to the first power transmission unit mounted to the first electric vehicle from the second power transmission unit to execute vehicle charging processing for charging the first electric vehicle.

In the charging system according, when a second electric vehicle is parked in a second parking space as one of a plurality of the parking spaces, the power transmission control unit may move the second power transmission unit into the prescribed range of the second parking space by the moving mechanism to cause the first power transmission unit mounted to the second electric vehicle and the second power transmission unit to face each other so as to transmit the power to the second power transmission unit from the first power transmission unit mounted to the second electric vehicle to execute vehicle discharging processing for recovering the power discharged from the second electric vehicle.

The charging system according may further include a first use plan information acquisition unit that acquires first use plan information indicating a use plan of the first electric vehicle that is parked in the first parking space or expected to be parked in the first parking space, in which the power transmission control unit may determine an execution timing of the vehicle charging processing based on the first use plan information.

The charging system according may further include a second use plan information acquisition unit that acquires second use plan information indicating a use plan of the second electric vehicle that is parked in the second parking space or expected to be parked in the second parking space, in which the power transmission control unit may determine an execution timing of the vehicle discharging processing based on the second use plan information.

The charging system may further include: a first use plan information acquisition unit that acquires first use plan information indicating a use plan of the first electric vehicle that is parked in the first parking space or expected to be parked in the first parking space; a second use plan information acquisition unit that acquires second use plan information indicating a use plan of the second electric vehicle that is parked in the second parking space or expected to be parked in the second parking space; and a power storage unit, in which the power transmission control unit may execute the vehicle discharging processing at a timing determined based on the second use plan information to recover the power discharged from the second electric vehicle to the power storage unit, and may execute the vehicle charging processing by feeding the power recovered in the power storage unit to the first electric vehicle at a timing determined based on the first use plan information.

The charging system may further include a vertical direction position changing unit that changes a position in a vertical direction of the second power transmission unit mounted to the mount unit, in which the first power transmission unit may be mounted at a bottom part of the electric vehicle, and when executing the vehicle charging processing, the power transmission control unit may change the position in the vertical direction of the second power transmission unit by the vertical direction position changing unit to adjust a distance between the first power transmission unit mounted to the first electric vehicle and the second power transmission unit.

In the charging system, the moving mechanism may include a slide unit to which the mount unit is provided, the slide unit being disposed at a position lower than a road surface of a plurality of the parking spaces, and the second power transmission unit mounted to the mount unit, while being in a state with the position in the vertical direction being lower than the road surface of the parking space, may be moved within the moving range by the slide unit.

As a second aspect for achieving the foregoing object, there is a charging device used in a parking facility having a plurality of parking spaces each corresponding to a single vehicle for charging an electric vehicle parked in the parking space. The charging device includes: a second power transmission unit that performs wireless power transmission with a first power transmission unit mounted to the electric vehicle; and a moving mechanism including a mount unit mounting the second power transmission unit, the moving mechanism moving the second power transmission unit mounted to the mount unit within a moving area including each prescribed range within a plurality of the parking spaces.

According to the charging system, it is possible to install the charging equipment capable of charging a plurality of electric vehicles at a low cost.

DETAILED DESCRIPTION OF THE PREFERRED EMBODIMENTS

1. Configuration of Charging System

Figure 1:
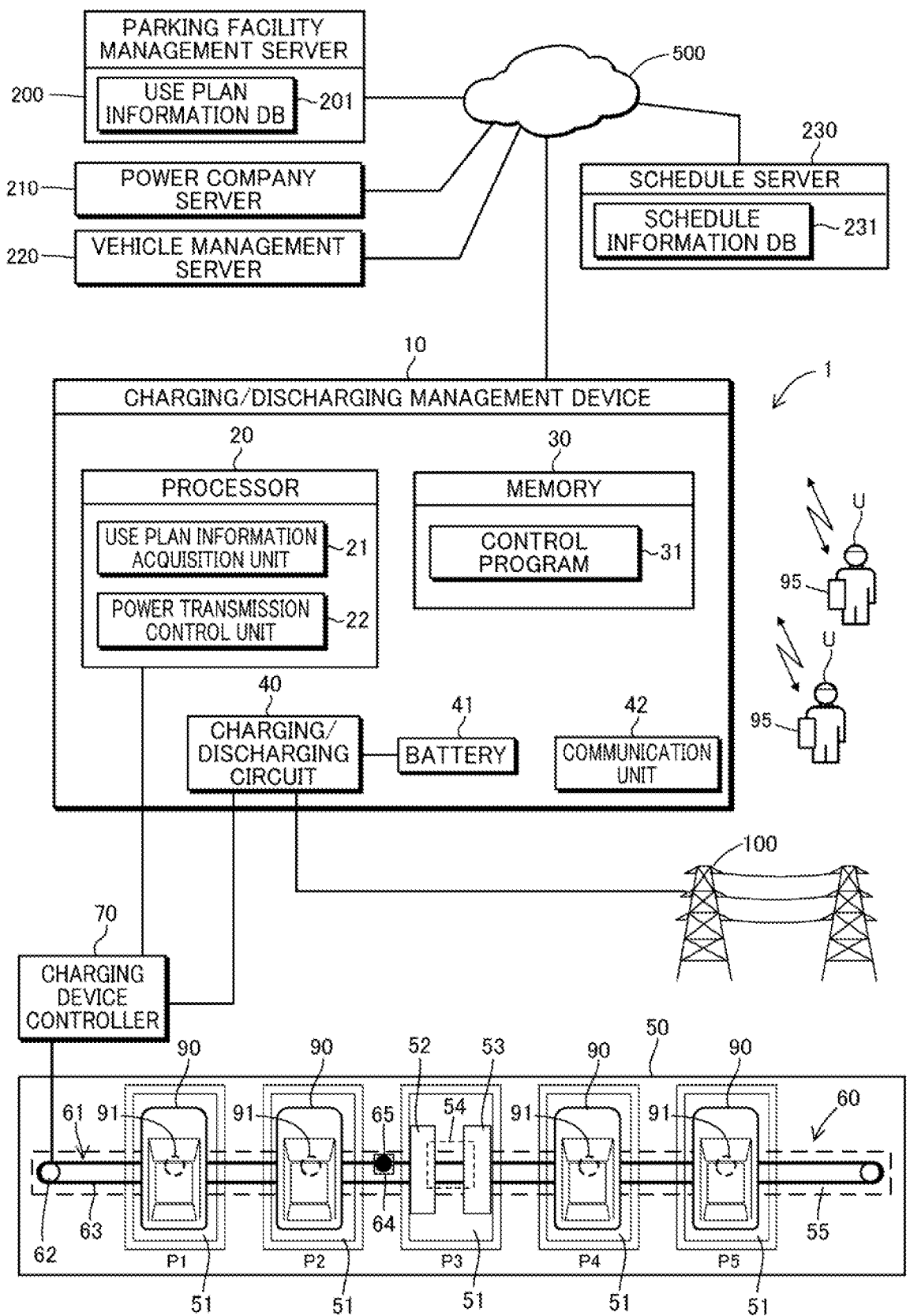
FIG. 1 is a block diagram of a charging system 1.
Figure 2:
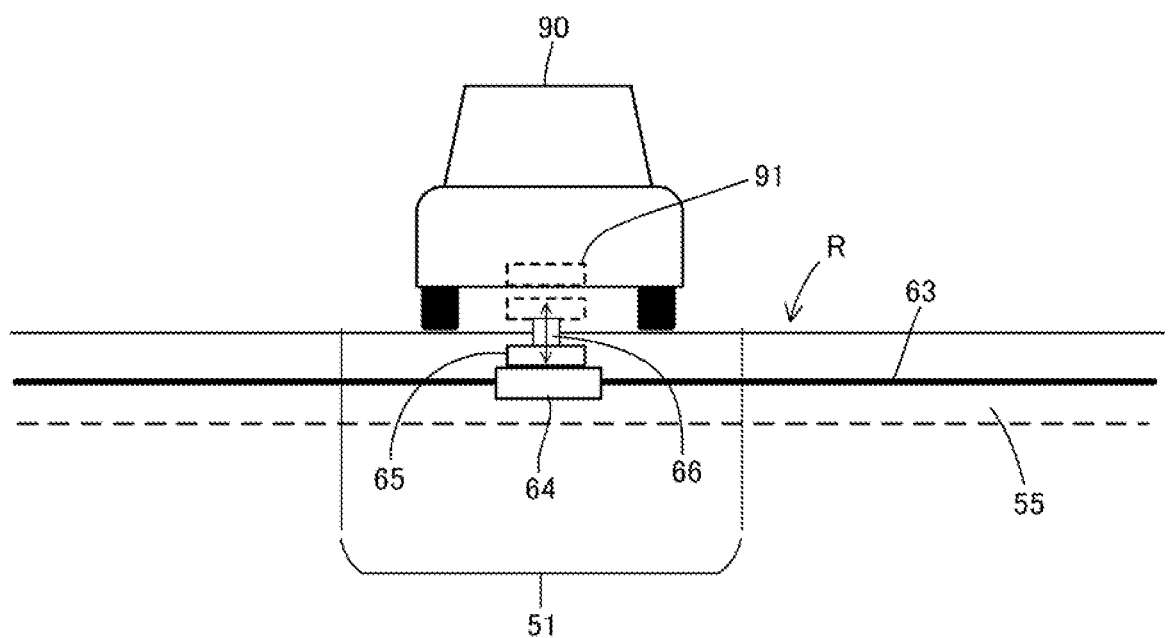
FIG. 2 is an explanatory diagram of a mode when performing wireless charging and discharging between a charging device and an electric vehicle.

Referring to FIG. 1 and FIG. 2, the configuration of a charging system 1 according to an embodiment will be described. Referring to FIG. 1, the charging system 1 performs charging and discharging processing wirelessly targeted on electric vehicles 90 parked in a parking facility 50. The parking facility 50 is a flat parking lot in which five parking spaces 51 each capable of having a single electric vehicle 90 parked therein are provided. The numbers of P1 to P5 are applied to each of the parking spaces 51.

The charging system 1 includes a charging device 60 disposed in the parking facility 50 and a charging/discharging management device 10. The charging device 60 includes: underneath the five parking spaces 51 of the parking facility 50, a moving mechanism 61 installed in a groove part 55 that is dug in a manner connecting between the five parking spaces 51; and a charging device controller 70 that controls operations of the moving mechanism 61. Each of the parking spaces 51 is provided with covers 52 and 53 for preventing tires of the electric vehicle 90 from falling into the groove part 55. The charging device controller 70 is a control unit configured with a processor, a memory, an interface circuit, and the like, not illustrated.

The moving mechanism 61 includes: a ring-like energization cable 63 disposed in a moving area including each of prescribed ranges 54 of the five parking spaces 51; a rotary actuator 62 to which the energization cable is placed; and a mount unit 64 attached to the energization cable 63. The moving mechanism 61 is configured to move a second power transmission unit 65 that is mounted to the mount unit 64 among the five parking spaces 51 by rotating the rotary actuator 62 to circulate the energization cable 63. In the groove part 55, position markings of the prescribed ranges 54 of each of the parking spaces 51 are applied. The charging device controller 70 recognizes the markings by a camera or the like, not illustrated, to position the second power transmission unit 65 within the prescribed range 54 of each of the parking spaces 51.

As illustrated in FIG. 2, the mount unit 64 includes a lifting mechanism 66 (corresponds to a vertical direction position changing unit of the present disclosure) that lifts up and down the second power transmission unit 65 in the vertical direction. FIG. 2 illustrates a mode when charging the electric vehicle 90 parked in the parking space 51 or discharging electricity from the electric vehicle 90. The second power transmission unit 65 is moved to and positioned at a position facing a first power transmission unit 91 that is provided at the bottom of the electric vehicle 90 by circulation of the energization cable 63. The prescribed range 54 of each of the parking spaces 51 illustrated in FIG. 1 is set to be a range assumed to be facing the first power transmission unit 91 provided to the electric vehicle 90 that is parked in the parking space 51.

Each of the first power transmission unit 91 and the second power transmission unit 65 has a reception-side coil and a transmission-side coil, and performs wireless power transmission using a magnetic field induction type, a magnetic field resonance type, or the like. The second power transmission unit 65 transmits/receives power to/from the charging device controller 70 via the energization cable 63. When performing wireless power transmission between the first power transmission unit 91 and the second power transmission unit 65, the charging device controller 70 lifts up the second power transmission unit 65 by the lifting mechanism 66 to shorten the distance between the first power transmission unit 91 and the second power transmission unit 65.

The charging device controller 70 acquires information of the power transmission efficiency between the first power transmission unit 91 and the second power transmission unit 65 by having communication with the electric vehicle 90 or by detection using the second power transmission unit 65, and adjusts the position of the second power transmission unit 65 by the lifting mechanism 66 to achieve optimal transmission efficiency. Furthermore, by having communication between the charging device controller 70 and the electric vehicle 90 before starting power transmission, it is possible on the vehicle 90 side to check the positioning state between the first power transmission unit 91 and the second power transmission unit 65.

Furthermore, when moving the second power transmission unit 65 by circulating the energization cable 63, the charging device controller 70 lifts down the second power transmission unit 65 by the lifting mechanism 66 to a position lower than a road surface R of the parking space 51. This makes it possible to avoid blocking the movement of the second power transmission unit 65 by the parked electric vehicle 90. Note here that the energization cable 63 to which the mount unit 64 is attached and which moves the mount unit 64 by being circulated by the drive of the rotary actuator 62 corresponds to a slide unit of the present disclosure.

As illustrated in FIG. 2, when charging the electric vehicle 90, the electric vehicle 90 corresponds to a first electric vehicle of the present disclosure, and the parking space 51 where the electric vehicle 90 is parked corresponds to a first parking space of the present disclosure. Furthermore, as illustrated in FIG. 2, when discharging electricity from the electric vehicle 90 to recover the power therefrom, the electric vehicle 90 corresponds to a second electric vehicle of the present disclosure, and the parking space 51 where the electric vehicle 90 is parked corresponds to a second parking space of the present disclosure.

Referring to FIG. 1, the charging/discharging management device 10 is a computer system configured with a processor 20, a memory 30, a charging/discharging circuit 40, a battery 41 (corresponds to a power storage unit of the present disclosure), a communication unit 42, and the like. The charging/discharging circuit 40 is connected to the charging device controller 70, and performs transmission of the power with the second power transmission unit 65 via the energization cable 63 and the charging device controller 70. Furthermore, the charging/discharging circuit 40 is connected to a commercial power grid 100, and performs transmission of the power (purchasing the power and selling the power) with the commercial power grid 100. Note here that the commercial power includes the power generated by renewable energies (solar, wind, geothermal energies, and the like).

The battery 41 is connected to the charging/discharging circuit 40 to be charged by the power output from the charging/discharging circuit 40 and to feed the power to the charging/discharging circuit 40. The communication unit 42 performs communication with a parking facility management server 200, a power company server 210, a vehicle management server 220, a schedule server 230, and the like via a communication network 500. The parking facility management server 200, the power company server 210, the vehicle management server 220, and the schedule server 230 are computer systems configured with a processor, a memory, a communication unit, and the like, not illustrated.

The schedule server 230 includes a schedule information DB 231 in which activity plans of a plurality of users U are recorded. The schedule server 230 is set in mobile terminals 95 (smartphones, mobile phones, tablet terminals, or the like) of a plurality of the users U using the parking facility, receives information of the activity plan of each of the users U uploaded from the mobile terminal 95, and records it in the schedule information DB 231.

The parking facility management server 200 recognizes the planned date and time at which the user U is planning to use the electric vehicle 90 based on the activity plan of the user U recorded in the schedule information DB 231 and records it in a use plan information DB 201. The power company server 210 provides information on the commercial power rate, excess and shortage of supply of the commercial power, and the like. The vehicle management server 220 performs communication with each of the electric vehicles 90 to acquire vehicle information indicating the state (current position, traveling condition, remaining battery level, and the like) of each of the electric vehicles 90.

The processor 20 functions as a use plan information acquisition unit 21 and a power transmission control unit 22 by reading and executing a control program 31 saved in the memory 30. The use plan information acquisition unit 21 acquires the use plan information of each of the parking spaces 51 by accessing the use plan information DB 201 of the parking facility management server 200. The power transmission control unit 22 executes vehicle charging processing for charging electricity by the charging device 60 or vehicle discharging processing for recovering the power by discharging the electricity by the charging device 60 targeted on the electric vehicle 90 parked in one of the parking space 51 based on the use plan of each of the parking spaces 51, the battery remaining level of the electric vehicle 90 started to park at the parking space 51, the commercial power supply state, or the like.

The charging/discharging management device 10 and the charging device controller 70 are connected to be able to communicate and to be able to transmit the power. The charging/discharging management device 10 transmits a control signal to the charging device controller 70 to move the second power transmission unit 65 by the moving mechanism 61 to execute the vehicle charging processing and the vehicle discharging processing. Furthermore, when executing the vehicle charging processing, the charging/discharging management device 10 feeds the power to the second power transmission unit 65 from the charging/discharging circuit 40 via the energization cable 63. When executing the vehicle discharging processing, the charging/discharging management device 10 recovers the power received at the second power transmission unit 65 by the charging/discharging circuit 40 via the energization cable 63, and stores in the battery 41.

2. Vehicle Charging Processing and Vehicle Discharging Processing

According to the flowchart illustrated in FIG. 3, execution procedures of the vehicle charging processing and the vehicle discharging processing executed by the charging system 1 will be described.

Figure 3:
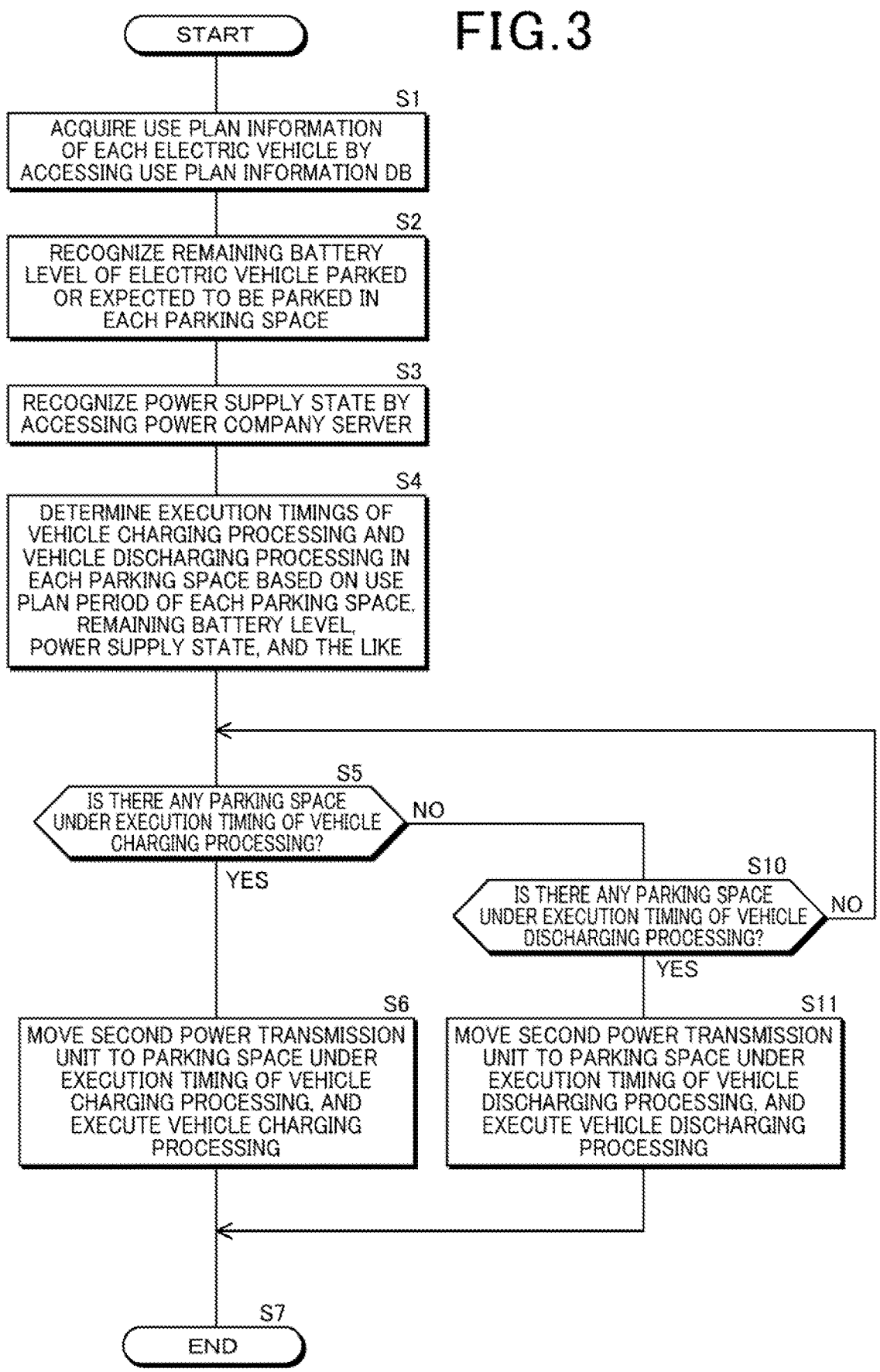
FIG. 3 is a flowchart of vehicle charging processing and vehicle discharging processing.

In Step S1 of FIG. 3, the use plan information acquisition unit 21 acquires the use plan information of each of the electric vehicles 90 by accessing the use plan information DB 201 of the parking facility management server 200. In subsequent Step S2, the power transmission control unit 22 recognizes the battery remaining level of the electric vehicle 90 that is parked or expected to park in the parking space 51 by accessing the vehicle management server 220. In next Step S3, the power transmission control unit 22 recognizes the supply state of the commercial power including the power generated by the renewable energies by accessing the power company server 210.

In next Step S4, the power transmission control unit 22 determines the execution timings of the vehicle charging processing and the vehicle discharging processing in each of the parking spaces 51 based on the use plan period (from the use start planned date and time to the use end plan date and time) of each of the parking spaces 51 assumed from the use plans of each of the electric vehicles 90, the battery remaining level of the electric vehicle 90 that is parked or expected to park in the parking space 51, and the supply state of the commercial power.

Specifically, the power transmission control unit 22 determines the execution timings of the vehicle charging processing and the vehicle discharging processing as in following (1) to (4), for example.

(1) The power transmission control unit 22 determines the execution timing of the vehicle charging processing or the vehicle discharging processing for the electric vehicle 90 parked in each of the parking spaces 51 based on the use plan period of each of the parking spaces 51, the power consumption plan of the parking facility 50 (charging plan for the parking electric vehicle 90), demand response (supply state) of the commercial power, and the like. The power transmission control unit 22 may estimate the use plan period based on the travel plan of the user U (including the departure and arrival dates and time of the departure flight and arrival flight, in a case where the user U parks the electric vehicle in the parking space 51 and travels by airplanes).

(2) When recognized that there is surplus in the power generated by the renewable energies, the power transmission control unit 22 determines the execution timing of the vehicle charging processing so as to actively charge the battery of the electric vehicle 90 parked in the parking space 51 and effectively utilize the power generated by the renewable energies. This makes it possible to make a charging/discharging plan that can reduce $CO_2$ emission.

(3) Inversely, when there is shortage of the commercial power, the power transmission control unit 22 determines the execution timing of the vehicle discharging processing so as to discharge the electricity from the electric vehicle 90 parked in the parking space 51 and sell the recovered power. Thereby, it is possible to contribute to easing the shortage of the commercial power. Furthermore, in a case where there is a till plenty of time until starting the use of the electric vehicle 90 parked in any of the parking spaces 51, the execution timings of the vehicle discharging processing and the vehicle charging processing may be determined to recover the power discharged from the electric vehicle 90 into the battery 41 and charge the electric vehicle 90 parked in another parking space 51 with the recovered power. This makes it possible to suppress consumption of the insufficient commercial power.

(4) In a case where a commercial power night discount time zone is included in the period where the electric vehicle 90 is parked in the parking space 51, the power transmission control unit 22 determines the execution timing of the vehicle charging processing such that the vehicle charging processing can be completed within the discount time zone.

By loop processing of subsequent Step S5 and Step S6, the power transmission control unit 22 determines in Step S5 whether there is any parking space 51 that has reached the execution timing of the vehicle charging processing, and determines in Step S10 whether there is any parking space 51 that has reached the execution timing of the vehicle discharging processing.

When it has reached the execution timing of the vehicle charging processing, the power transmission control unit 22 proceeds the processing from Step S5 to Step S6. In Step S6, the power transmission control unit 22 moves the second power transmission unit 65 by the moving mechanism 61 to the parking space 51 that has reached the execution timing of the vehicle charging processing so as to execute the vehicle charging processing, and proceeds the processing to Step S7.

Furthermore, when it has reached the execution timing of the vehicle discharging processing, the power transmission control unit 22 proceeds the processing from Step S10 to Step S11. In Step S11, the power transmission control unit 22 moves the second power transmission unit 65 by the moving mechanism 61 to the parking space 51 that has reached the execution timing of the vehicle discharging processing so as to execute the vehicle discharging processing, and proceeds the processing to Step S7.

3. Another Embodiment

In the embodiment above, as the moving mechanism for moving the second power transmission unit 65, described is the moving mechanism 61 that moves the mount unit 64 to which the second power transmission unit 65 is mounted by circulating the ring-like energization cable 63. However, it is also possible to employ a moving mechanism of another structure. For example, the second power transmission unit 65 may be mounted to a mount unit that runs by itself in the groove part 55. In that case, a current collector (may be a structure like a pantograph, for example) provided to the mount unit may be brought in contact with the energization cable disposed in the groove part to be able to energize between the energization cable and the second power transmission unit 65. Furthermore, the self-running mount unit has a function of the slide unit of the present disclosure.

In the embodiment above, the power transmission control unit 22 determines the execution timings of the vehicle charging processing and the vehicle discharging processing based on the use plan of the electric vehicle 90, the battery remaining level of the electric vehicle 90, and the supply state of the commercial power. As another embodiment, however, the power transmission control unit 22 may determine the execution timings of the vehicle charging processing and the vehicle discharging processing based on any one of or any two among the use plan of the electric vehicle 90, the battery remaining level of the electric vehicle 90, and the supply state of the commercial power.

While the lifting mechanism 66 for moving the second power transmission unit 65 mounted to the mount unit 64 is provided to the moving mechanism 61 in the embodiment above, it is also possible to omit the lifting mechanism. Furthermore, while the lifting mechanism 66 provided to the mount unit 64 is illustrated in FIG. 2 as a vertical direction position changing unit of the present disclosure, the position of the second power transmission unit 65 in the vertical direction may be changed by a vertical direction position changing unit of another structure. For example, the position of the second power transmission unit 65 in the vertical direction may be changed by changing the position in the vertical direction of the energization cable 63 to which the mount unit 64 is attached.

Note that FIG. 1 and FIG. 2 are schematic diagrams illustrating the configuration of the charging system 1 by sectioning it in accordance with the main processing contents in order to facilitate understanding of the present invention, and the configuration of the charging system 1 may also be formed by other sectioned blocks. Furthermore, the processing of each structural element may be executed by a single hardware unit or may be executed by a plurality of hardware units. Moreover, the processing of each structural element illustrated in FIG. 3 may be executed by a single program or may be executed by a plurality of programs.

4. Configuration Supported by the Embodiments

The above-described embodiments are specific examples of the following items.

(Item 1) A charging system used in a parking facility having a plurality of parking spaces each corresponding to a single vehicle for charging an electric vehicle parked in the parking space, the charging system including: a second power transmission unit that performs wireless power transmission with a first power transmission unit mounted to the electric vehicle; a moving mechanism including a mount unit mounting the second power transmission unit, the moving mechanism moving the second power transmission unit mounted to the mount unit within a moving area including each prescribed range within a plurality of the parking spaces; and a power transmission control unit that, when a first electric vehicle is parked in a first parking space as one of a plurality of the parking spaces, moves the second power transmission unit into the prescribed range of the first parking space by the moving mechanism to cause the first power transmission unit mounted to the first electric vehicle and the second power transmission unit to face each other so as to transmit power to the first power transmission unit mounted to the first electric vehicle from the second power transmission unit to execute vehicle charging processing for charging the first electric vehicle.

According to the charging system of item 1, it is possible to install charging equipment capable of charging a plurality of electric vehicles at a low cost.

(Item 2) In the charging system according to item 1, when a second electric vehicle is parked in a second parking space as one of a plurality of the parking spaces, the power transmission control unit moves the second power transmission unit into the prescribed range of the second parking space by the moving mechanism to cause the first power transmission unit mounted to the second electric vehicle and the second power transmission unit to face each other so as to transmit the power to the second power transmission unit from the first power transmission unit mounted to the second electric vehicle to execute vehicle discharging processing for recovering the power discharged from the second electric vehicle.

According to the charging system of item 2, it is possible to install charging equipment capable of charging and discharging a plurality of electric vehicles at a low cost.

(Item 3) The charging system according to item 1 or 2, further including a first use plan information acquisition unit that acquires first use plan information indicating a use plan of the first electric vehicle that is parked in the first parking space or expected to be parked in the first parking space, in which the power transmission control unit determines an execution timing of the vehicle charging processing based on the first use plan information.

According to the charging system of item 3, it is possible to determine an appropriate execution timing of the vehicle charging processing for the first electric vehicle based on the use plan of the first electric vehicle.

(Item 4) The charging system of item 2, further including a second use plan information acquisition unit that acquires second use plan information indicating a use plan of the second electric vehicle that is parked in the second parking space or expected to be parked in the second parking space, in which the power transmission control unit determines an execution timing of the vehicle discharging processing based on the second use plan information.

According to the charging system of item 4, it is possible to determine an appropriate execution timing of the vehicle discharging processing for the second electric vehicle based on the use plan of the second electric vehicle.

(Item 5) The charging system of item 2, further including: a first use plan information acquisition unit that acquires first use plan information indicating a use plan of the first electric vehicle that is parked in the first parking space or expected to be parked in the first parking space; a second use plan information acquisition unit that acquires second use plan information indicating a use plan of the second electric vehicle that is parked in the second parking space or expected to be parked in the second parking space; and a power storage unit, in which the power transmission control unit executes the vehicle discharging processing at a timing determined based on the second use plan information to recover the power discharged from the second electric vehicle to the power storage unit, and executes the vehicle charging processing by feeding the power recovered in the power storage unit to the first electric vehicle at a timing determined based on the first use plan information.

According to the charging system of item 5, it is possible to determine appropriate execution timings of the vehicle discharging processing and the vehicle charging processing for charging the first electric vehicle by the power discharged from the second electric vehicle based on the use plans of the first electric vehicle and the second electric vehicle.

(Item 6) The charging system according to item 1, further including a vertical direction position changing unit that changes a position in a vertical direction of the second power transmission unit mounted to the mount unit, in which the first power transmission unit is mounted at a bottom part of the electric vehicle, and when executing the vehicle charging processing, the power transmission control unit changes the position in the vertical direction of the second power transmission unit by the vertical direction position changing unit to adjust a distance between the first power transmission unit mounted to the first electric vehicle and the second power transmission unit.

According to the charging system of item 6, it is possible to improve the power transmission efficiency between the first power transmission unit and the second power transmission unit by changing the position of the second power transmission unit using the vertical direction position changing unit.

(Item 7) The charging system of any one of items 1 to 6, in which the moving mechanism includes a slide unit to which the mount unit is provided, the slide unit being disposed at a position lower than a road surface of a plurality of the parking spaces, and the second power transmission unit mounted to the mount unit, while being in a state with the position in the vertical direction being lower than the road surface of the parking space, is moved within the moving range by the slide unit.

According to the charging system of item 7, it is possible to move the second power transmission unit by avoiding interference with the electric vehicle parked in the parking space.

(Item 8) A charging device used in a parking facility having a plurality of parking spaces each corresponding to a single vehicle for charging an electric vehicle parked in the parking space, the charging device including: a second power transmission unit that performs wireless power transmission with a first power transmission unit mounted to the electric vehicle; and a moving mechanism including a mount unit mounting the second power transmission unit, the moving mechanism moving the second power transmission unit mounted to the mount unit within a moving area including each prescribed range within a plurality of the parking spaces.

By employing the charging device of item 8, it is possible to install charging equipment capable of charging a plurality of electric vehicles at a low cost.

REFERENCE SIGNS LIST

1 Charging system
10 Charging/discharging management device

20 Processor
21 Use plan information acquisition unit
22 Power transmission control unit
30 Memory
31 Control program
40 Charging/discharging circuit
41 Battery
42 Communication unit
50 Parking facility
51 Parking space
52, 53 Cover
54 Prescribed range
55 Groove part
60 Charging device
61 Moving mechanism
62 Rotary actuator
63 Energization cable
64 Mount unit
65 Second power transmission unit
66 Lifting mechanism
70 Charging device controller
90 Electric vehicle
91 First power transmission unit
95 User terminal
100 Commercial power grid
200 Parking facility management server
201 Use plan information DB
210 Power company server
220 Vehicle management server
230 Schedule server
231 Schedule information DB
U User

What is claimed is:

1. A charging system used in a parking facility having a plurality of parking spaces each corresponding to a single vehicle for charging an electric vehicle parked in the parking space, the charging system comprising:
a second power transmission unit that performs wireless power transmission with a first power transmission unit mounted to the electric vehicle, the first power transmission unit and the second power transmission unit each include a reception-side coil and a transmission-side coil, and perform the wireless power transmission using a magnetic field induction type or a magnetic field resonance type;
a moving mechanism including a ring-like energization cable disposed in a moving area including each of prescribed ranges of the plurality of parking spaces, a rotary actuator to which the energization cable is placed, and a mount unit attached to the energization cable and mounting the second power transmission unit, the moving mechanism moving the second power transmission unit within the moving area including each prescribed range within the plurality of parking spaces, the second power transmission unit is mounted to the mount unit and transmits and receives power via the energization cable by rotating the rotary actuator to circulate the energization cable; and
a processor that, when a first electric vehicle is parked in a first parking space as one of the plurality of the parking spaces, moves the second power transmission unit into the prescribed range of the first parking space by the moving mechanism to cause the first power transmission unit mounted to the first electric vehicle and the second power transmission unit to face each other so as to transmit power to the first power transmission unit mounted to the first electric vehicle from the second power transmission unit to execute vehicle charging processing for charging the first electric vehicle.

2. The charging system according to claim 1, wherein, when a second electric vehicle is parked in a second parking space as one of the plurality of the parking spaces, the processor moves the second power transmission unit into the prescribed range of the second parking space by the moving mechanism to cause the first power transmission unit mounted to the second electric vehicle and the second power transmission unit to face each other so as to transmit the power to the second power transmission unit from the first power transmission unit mounted to the second electric vehicle to execute vehicle discharging processing for recovering the power discharged from the second electric vehicle.

3. The charging system according to claim 1, wherein the processor acquires first use plan information indicating a use plan of the first electric vehicle that is parked in the first parking space or expected to be parked in the first parking space, and
determines an execution timing of the vehicle charging processing based on the first use plan information.

4. The charging system according to claim 2, wherein the processor acquires second use plan information indicating a use plan of the second electric vehicle that is parked in the second parking space or expected to be parked in the second parking space, and
determines an execution timing of the vehicle discharging processing based on the second use plan information.

5. The charging system according to claim 2, further comprising:
a power storage unit,
wherein the processor
acquires first use plan information indicating a use plan of the first electric vehicle that is parked in the first parking space or expected to be parked in the first parking space;
acquires second use plan information indicating a use plan of the second electric vehicle that is parked in the second parking space or expected to be parked in the second parking space; and
executes the vehicle discharging processing at a timing determined based on the second use plan information to recover the power discharged from the second electric vehicle to the power storage unit, and executes the vehicle charging processing by feeding the power recovered in the power storage unit to the first electric vehicle at a timing determined based on the first use plan information.

6. The charging system according to claim 1, wherein
the first power transmission unit is mounted at a bottom part of the electric vehicle, and
the processor
changes a position in a vertical direction of the second power transmission unit mounted to the mount unit; and
when executing the vehicle charging processing, acquires information on power transmission efficiency between the first power transmission unit and the second power transmission unit by having communication between the electric vehicle or by detection using the second power transmission unit, changes the position in the vertical direction of the second power transmission unit by the vertical direction position changing unit so as to achieve optimal transmission to adjust a distance between the first power transmission unit mounted to the first electric vehicle and the second power transmission unit.

7. The charging system according to claim 1, wherein the ring-like energization cable includes a slide unit to which the mount unit is provided, the slide unit being disposed at a position lower than a road surface of the plurality of parking spaces, and the second power transmission unit mounted to the mount unit, while being in a state with the position in the vertical direction being lower than the road surface of the parking space, is moved within the moving range by circulating the ring-like energization cable.

8. A charging device used in a parking facility having a plurality of parking spaces each corresponding to a single vehicle for charging an electric vehicle parked in the parking space, the charging device comprising:

a second power transmission unit that performs wireless power transmission with a first power transmission unit mounted to the electric vehicle, the first power transmission unit and the second power transmission unit each include a reception-side coil and a transmission-side coil, and perform the wireless power transmission using a magnetic field induction type or a magnetic field resonance type; and a moving mechanism including a ring-like energization cable disposed in a moving area including each of prescribed ranges of the plurality of parking spaces, a rotary actuator to which the energization cable is placed, and a mount unit attached to the energization cable and mounting the second power transmission unit, the moving mechanism moving the second power transmission unit within the moving area including each prescribed range within the plurality of parking spaces, the second power transmission unit is mounted to the mount unit and transmits and receives power via the energization cable by rotating the rotary actuator to circulate the energization cable.

9. A charging system used in a parking facility having a plurality of parking spaces each corresponding to a single vehicle for charging an electric vehicle parked in the parking space, the charging system comprising:

a second power transmission unit that performs wireless power transmission with a first power transmission unit mounted to the electric vehicle;

a moving mechanism including a mount unit mounting the second power transmission unit, the moving mechanism moving the second power transmission unit mounted to the mount unit within a moving area including each prescribed range within the plurality of the parking spaces;

a power storage unit; and a processor that, when a first electric vehicle is parked in a first parking space as one of the plurality of parking spaces, moves the second power transmission unit into the prescribed range of the first parking space by the moving mechanism to cause the first power transmission unit mounted to the first electric vehicle and the second power transmission unit to face each other so as to transmit power to the first power transmission unit mounted to the first electric vehicle from the second power transmission unit to execute vehicle charging processing for charging the first electric vehicle, wherein when a second electric vehicle is parked in a second parking space as one of the plurality of parking spaces, the processor moves the second power transmission unit into the prescribed range of the second parking space by the moving mechanism to cause the first power transmission unit mounted to the second electric vehicle and the second power transmission unit to face each other so as to transmit the power to the second power transmission unit from the first power transmission unit mounted to the second electric vehicle to execute vehicle discharging processing for recovering the power discharged from the second electric vehicle, the processor acquires first use plan information indicating a use plan of the first electric vehicle that is parked in the first parking space or expected to be parked in the first parking space;

acquires second use plan information indicating a use plan of the second electric vehicle that is parked in the second parking space or expected to be parked in the second parking space; and executes the vehicle discharging processing at a timing determined based on the second use plan information to recover the power discharged from the second electric vehicle to the power storage unit, and executes the vehicle charging processing by feeding the power recovered in the power storage unit to the first electric vehicle at a timing determined based on the first use plan information.

* * * * *